(12) United States Patent
Shin et al.

(10) Patent No.: US 11,794,356 B2
(45) Date of Patent: Oct. 24, 2023

(54) ELECTRIC GRIPPING DEVICE

(71) Applicant: KOREA ATOMIC ENERGY RESEARCH INSTITUTE, Daejeon (KR)

(72) Inventors: Hocheol Shin, Daejeon (KR); Seung-Ho Jung, Daejeon (KR); You-Rak Choi, Daejeon (KR); Dongseok Ryu, Seoul (KR); Jonghui Han, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 388 days.

(21) Appl. No.: 17/267,248

(22) PCT Filed: Jul. 24, 2019

(86) PCT No.: PCT/KR2019/009196
§ 371 (c)(1),
(2) Date: Feb. 9, 2021

(87) PCT Pub. No.: WO2020/036332
PCT Pub. Date: Feb. 20, 2020

(65) Prior Publication Data
US 2021/0162607 A1    Jun. 3, 2021

(30) Foreign Application Priority Data
Aug. 13, 2018    (KR) .................. 10-2018-0094533

(51) Int. Cl.
*B25J 15/02*    (2006.01)

(52) U.S. Cl.
CPC .................. *B25J 15/022* (2013.01)

(58) Field of Classification Search
CPC ... B25J 15/022; B25J 15/0009; B25J 15/0266
See application file for complete search history.

(56) References Cited

U.S. PATENT DOCUMENTS 4,600,357 A * 7/1986 Coules .................. B25J 13/082
414/730
4,897,014 A * 1/1990 Tietze .................. B25J 15/0491
414/729

(Continued)

FOREIGN PATENT DOCUMENTS

JP    S57-043994    3/1982
JP    2011-131341    7/2011

(Continued)

OTHER PUBLICATIONS

EPO, Extended European Search Report of the corresponding European Patent Application No. 19850193.4., dated May 3, 2022.

*Primary Examiner* — Stephen A Vu
(74) *Attorney, Agent, or Firm* — LEX IP MEISTER, PLLC

(57) ABSTRACT

An electric gripping device is provided. The electric gripping device improves a coupling relationship between a two-fingered clamper module using a four-joint link and the actuator module to facilitate assembling and disassembling of the actuator module and the clamper module and minimizes a length of the electric gripper to easily secure a robot's work space or work direction when being connected to the robot.

11 Claims, 5 Drawing Sheets

(56) References Cited

U.S. PATENT DOCUMENTS

| | | | |
|---|---|---|---|
| 5,108,140 A | 4/1992 | Bartholet | |
| 7,370,896 B2 * | 5/2008 | Anderson | B25J 15/08 901/39 |
| 8,534,729 B2 * | 9/2013 | Wilkinson | B25J 15/08 901/34 |
| 9,718,195 B1 * | 8/2017 | Youmans | B25J 15/103 |
| 2014/0265401 A1 | 9/2014 | Allen Demers et al. | |
| 2018/0361589 A1 * | 12/2018 | Paquin | B25J 9/1697 |

FOREIGN PATENT DOCUMENTS

| | | |
|---|---|---|
| JP | 5892173 | 3/2016 |
| JP | 2018-120844 | 8/2018 |
| KR | 10-0824780 | 4/2008 |
| KR | 10-2010-0123175 A | 11/2010 |
| KR | 10-1124830 | 3/2012 |
| KR | 10-2013-0018402 | 2/2013 |
| KR | 10-1674894 | 11/2016 |
| KR | 10-1701236 | 2/2017 |
| WO | 2001-91979 | 12/2001 |

* cited by examiner

ELECTRIC GRIPPING DEVICE

TECHNICAL FIELD

The present invention relates to an electric gripping device.

BACKGROUND ART

A gripper may be used when picking up and transferring objects using automation equipment. When using the gripper, a pneumatic gripper with a simple structure and simple control can be used. Since the pneumatic gripper needs to have a separate pneumatic facility, the electric gripper may be used in cases of standalone equipment or a robot. Among the electric grippers, two-fingered grippers are widely used. Some electric grippers have fingers that perform a straight line movement like the pneumatic grippers, but most of them may use four-joint links on the fingers to increase the gripping distance.

The two-fingered electric gripper that uses four-joint links on the fingers takes up a lot of space as the length of the gripper increases when two fingers are moved simultaneously using one motor. Therefore, the two-fingered electric gripper using a joint link may act as a limitation in securing a work space and a work direction when being connected to a robot or the like.

As related prior art, Korean Patent No. 1,674,894 discloses "Multi-degrees of freedom gripper for industry", Korean Patent No. 1,701,236 discloses "Actuator module", and Japanese Patent No. 5,892,173 discloses "Robot hand and robot".

The above information disclosed in this Background section is only for enhancement of understanding of the background of the invention, and therefore it may contain information that does not form the prior art that is already known in this country to a person of ordinary skill in the art.

DISCLOSURE

Technical Problem

An embodiment of the present invention to provide an electric gripping device that easily realizes assembly and disassembly of an actuator module and a clamper module by improving a coupling relationship between a two-fingered clamper module using a four-joint link and an actuator module and easily secures a robot's work space or a work direction when being connected to the robot by minimizing a length of an electric gripper.

Technical Solution

An electric gripping device according to a first actuator module having a first fixing unit and generating a torque of a first drive shaft; a second actuator module having a second fixing unit and generating a torque of a second drive shaft; a main body unit having a first coupling unit in which the first actuator module is coupled at a position corresponding to the first fixing unit and the second actuator module is coupled at a position corresponding to the second fixing unit and a second coupling unit outside of which a part of a gripper is coupled; a first finger link unit having one end that is connected to each of the first actuator module and the main body to be link-connected and transmitting power corresponding to the first clamper of the other end; and a second finger link unit having one end that is connected to each of the second actuator module and the main body unit to be link-connected and transmitting power corresponding to a second clamper of the other end, wherein the first finger link unit and the second finger link unit are formed of a four-joint link, respectively, the first clamper and the second clamper are separated from each other to be provided at a position facing each other along the length direction of the main body unit, and the first clamper and the second clamper approach or are separated from each other.

The first finger link unit may include: an eleventh link rotating with a first connection point coupled to both sides of the length direction of the first drive shaft; a twelfth link rotating with a second connection point coupled to the main body unit; a thirteenth link rotating with a third connection point coupled to the eleventh link; and a fourteenth link having a fourth connection point coupled with the thirteenth link at one end, a fifth connection point coupled with the twelfth link at a bent part, and a fourteenth link with a first clamper at the other end. A straight line length a1 between the first connection point and the second connection point may be the same as a straight line length a2 between the fourth connection point and the fifth connection point. A straight line length b1 between the first connection point and the fourth connection point may be the same as a straight line length b2 between the second connection point and the fifth connection point.

The eleventh link may include: an eleventh connection part having one end respectively coupled to both sides of a length direction of the first drive shaft and the other end disposed to be inclined with a predetermined angle upward; and a twelfth connection part including an eleventh coupling rod formed in a length direction and coupled between the other ends of the eleventh connection part and a twelfth coupling rod formed to be elongated with a predetermined angle at the center of the length direction of the eleventh coupling rod to be coupled with one end of the twelfth link, wherein the eleventh connection part and the twelfth connection part may be coupled to be inclined with a predetermined angle in consideration of driving interference with the first actuator module.

The second finger link unit may include: a twenty-first link rotating with a first connection point coupled to both sides of the length direction of the second drive shaft; a twenty-second link rotating with a second connection point coupled to the main body unit; a twenty-third link rotating with a third connection point coupled to the twenty-first link; and a twenty-fourth link having a fourth connection point coupled with the twenty-third link at one end, a fifth connection point coupled with the twenty-second link at the bent part, and a second clamper at the other end.

The twenty-first link may include: a twenty-first connection part having one end respectively coupled to both sides of the length direction of the second drive shaft and the other end disposed to be inclined upward with a predetermined angle; and a twenty-second connection part having a twenty-first coupling rod formed in the length direction and coupled between the other ends of the twenty-first connection part and a twenty-second coupling rod elongated with a predetermined angle at the center part of the length direction of the twenty-first coupling rod and coupled with one end of the twenty-second link, wherein the twenty-first connection part and the twenty-second connection part may be combined obliquely at a predetermined angle in consideration of driving interference with the second actuator module.

The main body unit may include: a first body unit provided at one side via the first actuator module and the second actuator module and coupled with the first actuator module and the second actuator module; and a second body unit provided at the other side corresponding to the first body unit via the first actuator module and the second actuator module and coupled with the first actuator module and the second actuator module.

The first body unit may include: an eleventh body member formed of a cuboid panel shape; and a twelfth body member formed on the eleventh body member and having the second coupling unit, wherein an eleventh coupling unit may be formed at a position respectively corresponding to the first fixing unit and the second fixing unit at the lower surface of the eleventh body member.

The second body unit may include: a twenty-first body member formed at the position corresponding to the eleventh body member via the first actuator module and the second actuator module; and a twenty-second body member formed under the twenty-first body member and having a hand coupling unit, and a twenty-first coupling unit may be formed at the position respectively corresponding to the first fixing unit and the second fixing unit at the upper surface of the twenty-first body member.

The first fixing unit and the second fixing unit may be formed at the first actuator module and the second actuator module, respectively, and the first fixing unit may include a fastening hole provided at a concave groove formed at the edge of the first actuator module.

On the other hand, in an electric gripping device according to another embodiment of the present invention, the first fixing unit and the second fixing unit may be formed at the first actuator module and the second actuator module, and the first fixing unit may include a plurality of fastening holes provided at a protrusion formed along the circumferential surface on both sides of the first actuator module.

Advantageous Effects

An embodiment of the present invention improves the coupling relationship between the driving link of the gripper and the actuator module so as to not have interference between the driving link of the electric gripper and the actuator module, so that the assembly and disassembly of the actuator module and the driving link of the gripper nay be easily implemented, and when being connected to a robot, it is possible to easily secure the robot's work space or work direction.

MODE FOR INVENTION

Figure 1:
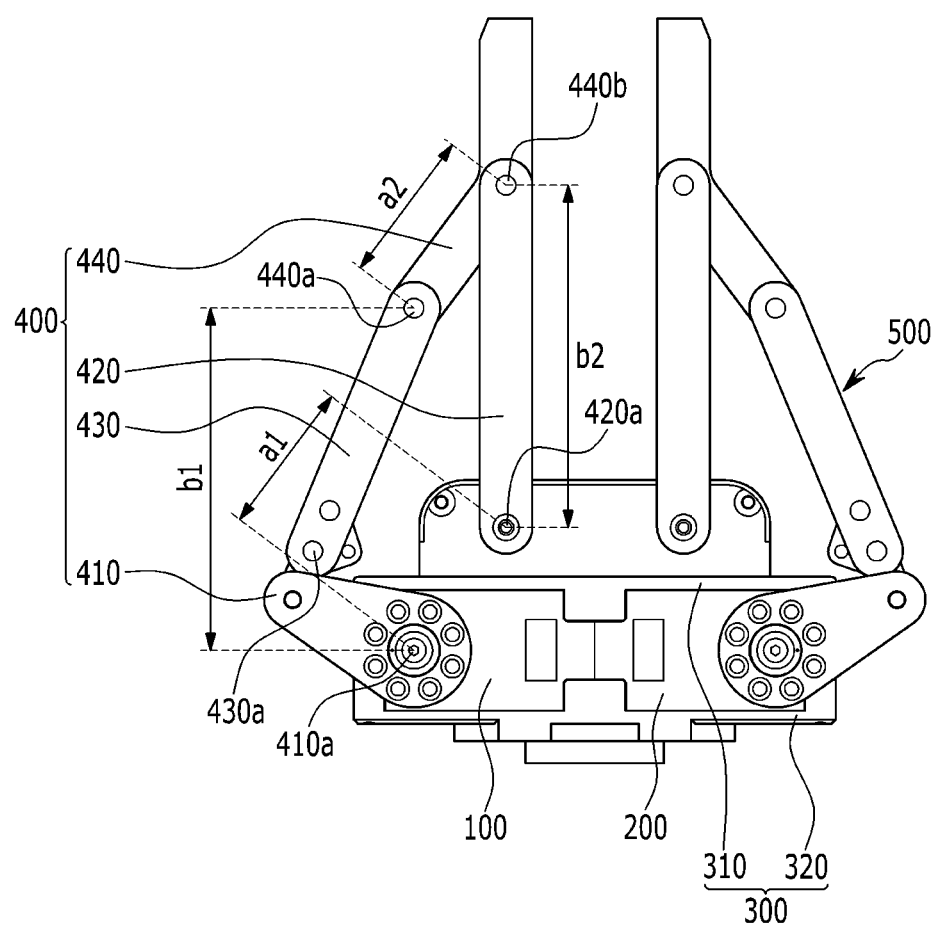
FIG. 1 is a front view showing a coupling state of an electric gripping device according to an embodiment of the present invention.

The present invention will be described more fully hereinafter with reference to the accompanying drawings, in which embodiments of the invention are shown. As those skilled in the art would realize, the described embodiments may be modified in various different ways, without departing from the spirit or scope of the present invention. In order to clearly explain the present invention, portions that are not directly related to the present invention are omitted, and the same reference numerals are attached to the same or similar constituent elements through the entire specification. In addition, in cases of well-known technologies, detailed descriptions thereof will be omitted.

Throughout the specification, unless explicitly described to the contrary, the word "comprise", and variations such as "comprises" or "comprising", will be understood to imply the inclusion of stated elements but not the exclusion of any other elements.

Now, an electric gripping device according to an embodiment of the present invention is described.

Figure 2:
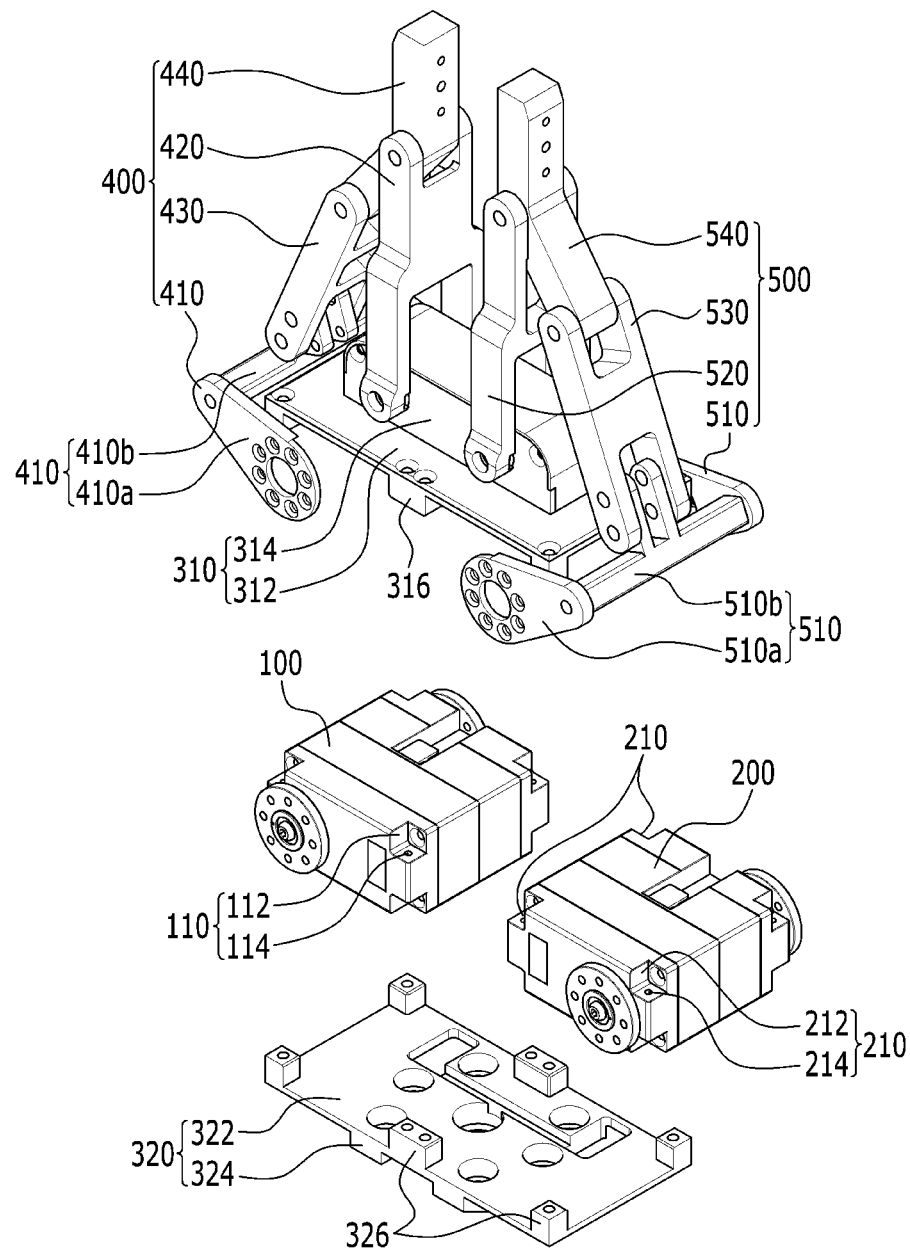
FIG. 2 is an exploded perspective view showing a coupling relation of an electric gripping device according to an embodiment of the present invention.
Figure 3:
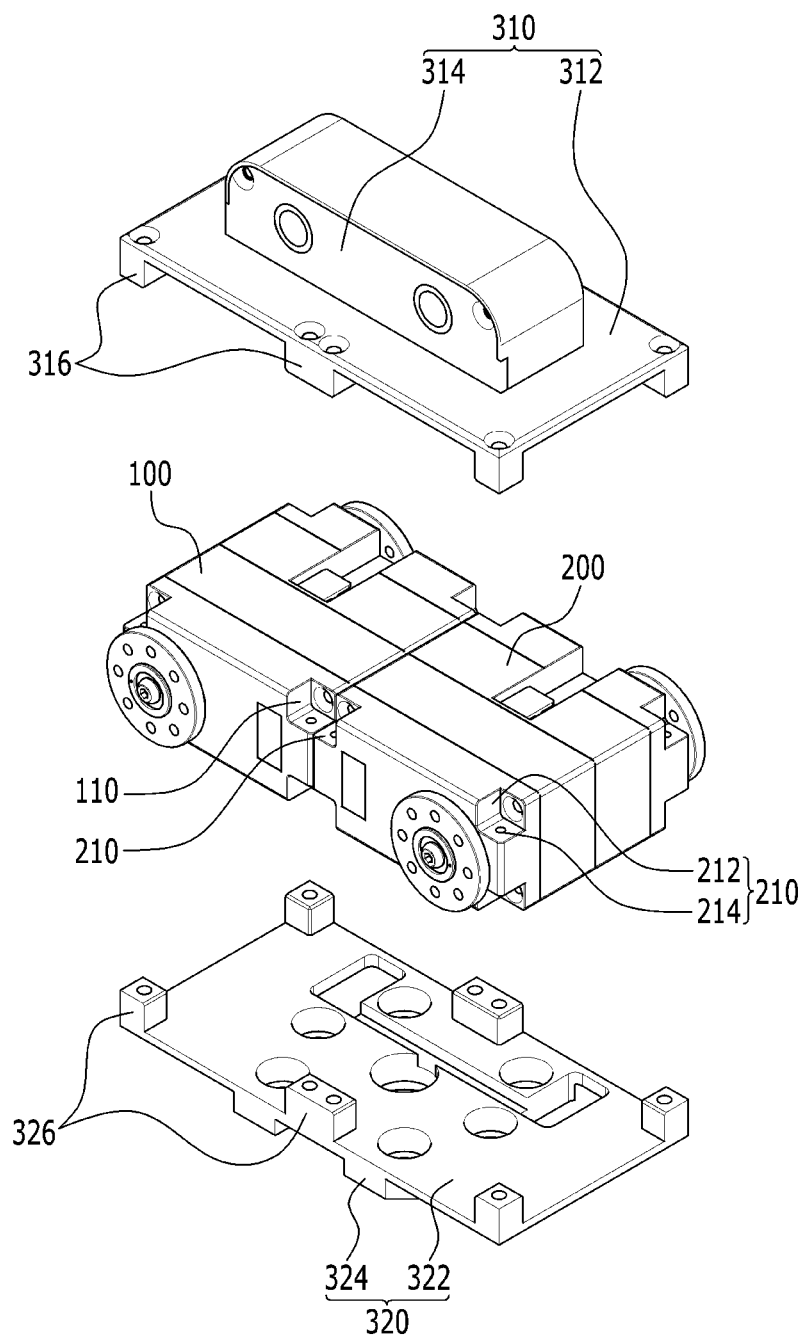
FIG. 3 is an exploded perspective view showing a coupling relation of a main body unit and an actuator module according to an embodiment of the present invention.

FIG. 1 is a front view showing a coupling state of an electric gripping device according to an embodiment of the present invention, FIG. 2 is an exploded perspective view showing a coupling relation of an electric gripping device according to an embodiment of the present invention, and FIG. 3 is an exploded perspective view showing a coupling relation of a main body unit and an actuator module according to an embodiment of the present invention. Referring to FIG. 1 to FIG. 3, an electric gripping device according to an embodiment of the present invention includes a first actuator module 100, a second actuator module 200, a main body unit 300, a first finger link unit 400, and a second finger link unit 500, wherein the first finger link unit 400 and the second finger link unit 500 are formed of the same four-joint link as each other, are separated from each other among a length direction of the main body unit 300, and are provided at positions where the first clamper and the second clamper face each other, thereby mutually approaching and separating from each other. The electric gripping device may be implemented with a two-fingered four-joint link electric gripper.

The first actuator module 100 has a first fixing unit 110, and may function as a first driver that generates a torque of a first drive shaft 102. The second actuator module 200 has a second fixing unit 210, disposed at a position corresponding to the first actuator module 100, and may function as a second driver that generates a torque of a second drive shaft 202. The first fixing unit 110 and the second fixing unit 210 may be combined with the main body unit 300 in a fastening structure. Thus, the first actuator module 100 and the second actuator module 200 may be easily coupled to or separated from the main body unit 300.

The main body unit 300 has a first coupling unit in which the first actuator module 100 and the second actuator module 200 are respectively coupled at positions respectively corresponding to the first fixing unit 110 and the second fixing unit 210, and a second coupling unit that is formed in a separate coupling structure and to which a part of the gripper is coupled on the outside. The main body unit 300 may include a first body unit 310 and a second body unit 320. The first body unit 310 is provided on one side via the first actuator module 100 and the second actuator module 200, and may be combined with the first actuator module 100 and the second actuator module 200. The first body unit 310 may include an eleventh body member 312 formed with a cuboid panel shape, and a twelfth body member 314 formed on the eleventh body member 312 and having a second coupling unit. An eleventh coupling unit 316 may be formed at positions respectively corresponding to the first fixing unit 110 and the second fixing unit 210 at the lower surface of the eleventh body member 312. Here, the first fixing unit 110 and the second fixing unit 210 may have the same shape as each other, and may be formed in the first actuator module 100 and the second actuator module 200. The first fixing unit 110 may include a fastening hole 114 provided on a concave groove 112 formed on the corner part of the first actuator module 100.

The second body unit 320 may be provided on the other side corresponding to the first body unit 310 via the first actuator module 100 and the second actuator module 200, and may be coupled with the first actuator module 100 and the second actuator module 200. The second body unit 320 may include a twenty-first body member 322 formed with a cuboid panel shape at a position corresponding to the eleventh body member 312 via the first actuator module 100 and the second actuator module 200, and a twenty-second body member 324 formed under the twenty-first body member 322 and having a hand coupling unit. A twenty-first coupling unit 326 may be formed at a position respectively corresponding to the first fixing unit 110 and the second fixing unit 210 on the upper surface of the twenty-first body member 322. Since one surface of the second body unit 320 may be fastened to the hand of the robot by using the twenty-second body member 324 having the hand coupling unit, it is easy to attach and detach the electric gripper to and from the hand of the robot. In addition, the fastening structure of the first actuator module 100 and the second actuator module 200 may be connected to the electric gripper by using only one side, so it is easy for it to be disassembled and assembled.

The first finger link unit 400 and the second finger link unit 500 may be formed of the same four-joint link as each other, and may be separated from each other along the length direction of the main body unit 300 and provided at the position where the first clamper and the second clamper face to each other, thereby mutually approaching and separating from each other. The first finger link unit 400 and the second finger link unit 500 have a pair of clampers that are spaced apart so as to mutually approach each other to hold objects, and these clampers may perform a gripping operation with a parallel link mechanism. Since the first finger link unit 400 and the second finger link unit 500 do not have a separate driver under the link, the entire length of the electric gripper may be minimized. Therefore, when being combined to the hand of the robot, the working radius in the working space may be reduced and it is possible to easily select and secure a work direction.

The first finger link unit 400 is respectively coupled to the first actuator module 100 and the main body unit 300 with one end, thereby transmitting corresponding power to the link-connected first clamper. The first finger link unit 400 may include an eleventh link 410, a twelfth link 420, a thirteenth link 430, and a fourteenth link 440.

The eleventh link 410 functions as a driving link, and may be formed with a predetermined angle in advance in consideration of interference with the first actuator module 100. The eleventh link 410 may be formed to be bent at an appropriate angle and be rotated with a first connection point 410a coupled to both sides in the length direction of the first drive shaft 102. The eleventh link 410 may include an eleventh connection part 412 and a twelfth connection part 414. The eleventh connection part 412 and the twelfth connection part 414 may be formed to be inclined at a predetermined angle in advance in consideration of the driving interference with the first actuator module 100. The eleventh connection part 412 may have one end coupled to both sides in the length direction of the first drive shaft 102, and the other end may be disposed to be inclined upward with a predetermined angle in advance. The eleventh connection part 412 may have one side formed wide and the other side formed narrow along a length direction. At a position where the eleventh connection part 412 is coupled to the first drive shaft 102, a coupling plate 102a may be provided around the first drive shaft 102. The coupling plate 102a has a plurality of fastening holes in a circumferential direction. In addition, the eleventh connection part 412 may have a coupling hole having a round shape corresponding to the shape of the coupling plate 102a and disposed corresponding to the fastening hole at a position corresponding to the coupling plate 102a. As the eleventh connection part 412 and the coupling plate 102a are coupled with the fastening structure at a plurality of positions, the driving force of the first actuator module 100 may be transmitted to the electric gripper more sturdily and stably.

The twelfth connection part 414 may include an eleventh coupling rod formed in the length direction and coupled between the other ends of the eleventh connection parts 412, and a twelfth coupling rod elongated with a predetermined angle in advance at the center part in the length direction of the eleventh coupling rod and coupled to one end of the thirteenth link 430.

The twelfth link 420 may be rotated with a second connection point 420a coupled to the main body unit 300. The thirteenth link 430 may be rotated with a third connection point 430a coupled to the eleventh link 410. The thirteenth link 430 may be implemented as one link so that it may be fixedly connected to the eleventh link 410 to be moved together. In this case, the thirteenth link 430 may be implemented with two third connection points 430a coupled to the eleventh link 410.

The fourteenth link 440 has a fourth connection point 440a coupled with the thirteenth link 430 at one end and a fifth connection point coupled with the twelfth link 420 at the bent part, and the other end has a first clamper. Here, the straight line length a1 between the first connection point 410a and the second connection point 420a may be the same as the straight line length a2 between the fourth connection point 440a and a fifth connection point 440b. In addition, the straight line length b1 between the first connection point 410a and the fourth connection point 440a may be the same as the straight line length b2 between the second connection point 420a and the fifth connection point 440b. Accordingly, the first finger link unit 400 and the second finger link unit 500 are formed of the same four-joint link as each other, and are disposed to be separated at positions facing each other along the length direction of the main body unit 300 and equally form the connection position between the links, thereby mutually approaching and separating from each other to be parallel to each other. Also, the first finger link unit 400 and the second finger link unit 500 may be easily detached from and attached to the main body unit 300, the first actuator module 100, and the second actuator module 200 while keeping them parallel. Therefore, it is possible to minimize the length of the electric gripper and secure the work space of the robot or the work direction when being connected to the robot.

One end of the second finger link unit 500 may be respectively coupled to the second actuator module 200 and the main body unit 300 to transmit the corresponding power to the link-connected second clamper of the other end. The second finger link unit 500 may include a twenty-first link 510, a twenty-second link 520, a twenty-third link 530, and a twenty-fourth link 540.

The twenty-first link 510 may be rotated with the first connection point 410a that is coupled to both sides in the length direction of the second drive shaft 202. The twenty-first link 510 may include a twenty-first connection part 512 and a twenty-second connection part 514, and the twenty-first connection part 512 and the twenty-second connection part 514 may be coupled with a predetermined angle in advance in consideration of driving interference with the second actuator module 200. In the twenty-first connection part 512, one end is coupled to both sides in the length direction of the second drive shaft 202, and the other end may be disposed to be inclined upward with a predetermined angle in advance. The twenty-second connection part 514 may include a twenty-first coupling rod formed in the length direction and coupled between the other ends of the twenty-first connection part 512, and a twenty-second coupling rod formed to be elongated with a predetermined angle at the center of the length direction of the twenty-first coupling rod and coupled to one end of the twenty-third link 530.

The twenty-second link 520 may be rotated with the second connection point 420a coupled to the main body unit 300. The twenty-third link 530 may be rotated with the third connection point 430a coupled to the twenty-first link 510. The twenty-third link 530 may be implemented as one link to be fixedly connected to the twenty-first link 510 and to move together. In this case, the twenty-third link 530 may be implemented with two third connection points 430a coupled to the twenty-first link 510.

The twenty-fourth link 540 has the fourth connection point 440a at one end that is coupled with the twenty-third link 530, the fifth connection point 440b that is coupled with the twenty-second link 520 at the bent part, and a second clamper at the other end.

As above-described, the electric gripping device according to an embodiment of the present invention may include the electric gripper of a two-fingered four-joint link shape that may realize the minimum length by being provided parallel between the main body unit 300 and the actuator module. In other words, by implementing the two-fingered four-joint link electric grippers in parallel when combining the actuator module and the gripper link module, when the electric gripper is combined with the robot's hand, the entire length of the electric gripper may be shortened to facilitate securing the work space or the work direction.

The electric gripping device may easily assemble and disassemble the actuator module and the clamper module by improving the coupling relationship between the two-fingered clamper module using the four-joint link and the actuator module. Also, the driving force of the first actuator module 100 and the second actuator module 200 may be transmitted directly to the first finger link unit 400 and the second finger link unit 500. In addition, by improving the coupling relationship between the clamper module and the actuator module so that the driving link of the clamper module does not interfere with the actuator module when the clamper module and actuator module are combined, when being connected to the robot, it is possible to easily secure the robot's work space or the work direction.

An operation of the electric gripping device according to an embodiment of the present invention is now described with reference to FIG. 1 to FIG. 3.

First, in the state that the first actuator module 100 and the second actuator module 200 are coupled to the main body unit 300, the first drive shaft 102 and the second drive shaft 202 may be respectively rotated by the driving of the first actuator module 100 and the second actuator module 200. When assuming that the first drive shaft 102 rotates in the clockwise direction by the driving of the first actuator module 100, the power of the first drive shaft 102 may be transferred to the eleventh link 410. Accordingly, the eleventh link 410 may be rotated in the same direction as the first drive shaft 102. If the first drive shaft 102 is rotated in the clockwise direction, the eleventh link 410 of the first finger link unit 400 may be interlocked and be rotated in the clockwise direction. Also, the thirteenth link 430 connected to the eleventh link 410 may move upward. The fourteenth link 440 may also be connected to the thirteenth link 430, so it may move upward. In this case, since the fourteenth link 440 is respectively connected to the twelfth link 420 and the thirteenth link 430, the fourteenth link 440 may move in the direction of the second finger link unit 500.

Meanwhile, the second drive shaft 202 may be rotated in a counterclockwise direction by the driving of the second actuator module 200 so that the second finger link unit 500 may be closed or unfolded together with the first finger link unit 400. When the second drive shaft 202 rotates in the counterclockwise direction, the twenty-first link 510 of the second finger link unit 500 is interlocked and may be rotated in the counterclockwise direction. Also, the twenty-third link 530 connected to the twenty-first link 510 may move upward. The twenty-fourth link 540 is also connected to the twenty-third link 530, so it may move upward. In this case, since the twenty-fourth link 540 is respectively connected to the twenty-second link 520 and the twenty-third link 530, the twenty-fourth link 540 may move in the direction of the first finger link unit 400.

As the eleventh link 410 and the twenty-first link 510 that are horizontally disposed based on the first drive shaft 102 of the first actuator module 100 and the second drive shaft 202 of the second actuator module 200 are rotated respectively in the clockwise direction and the counterclockwise direction, the first finger link unit 400 and the second finger link unit 500 may be close to each other. On the contrary, when the rotation direction of the first drive shaft 102 and the second drive shaft 202 is changed, the first finger link unit 400 and the second finger link unit 500 can be separated from each other.

As described above, if the electric gripping device according to an embodiment of the present invention is used, the coupling relationship between the clamper module and the actuator module is improved so that the driving link of the electric gripper does not interfere with the actuator module, thereby it is possible to easily assemble and disassemble the actuator module and the clamper module. And since the length of the electric gripper is minimized, it is easy to secure the work space or the work direction when the electric gripper is attached to the hand of the robot, so the use of the electric gripper may be greatly expanded.

Figure 4:
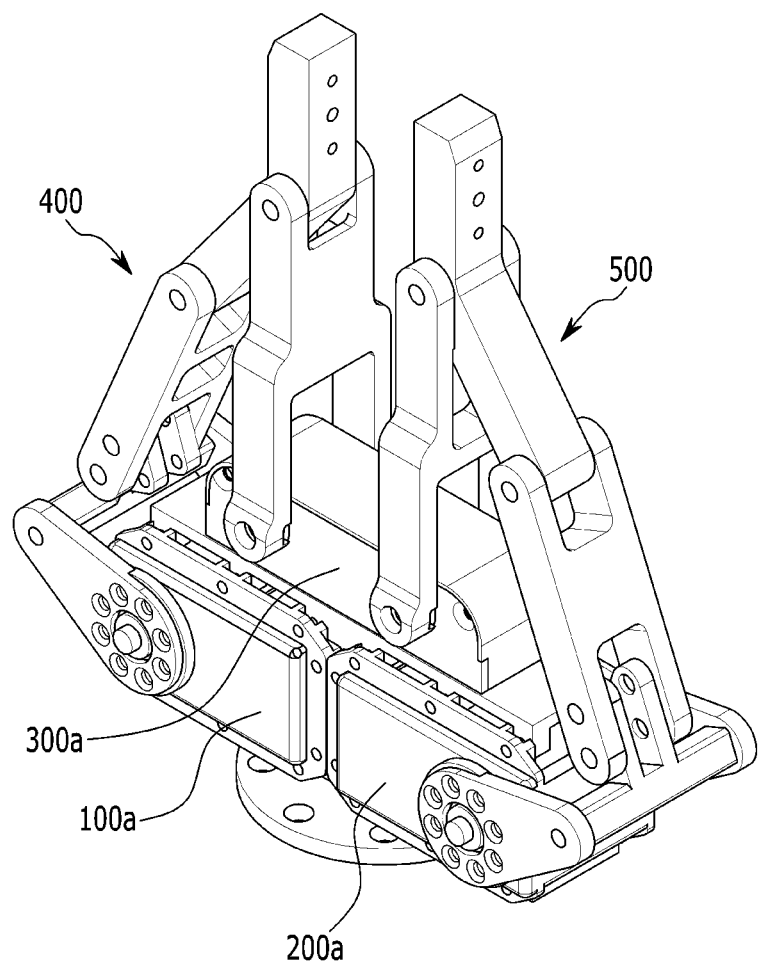
FIG. 4 is a perspective view showing a coupling state of an electric gripping device according to another embodiment of the present invention.
Figure 5:
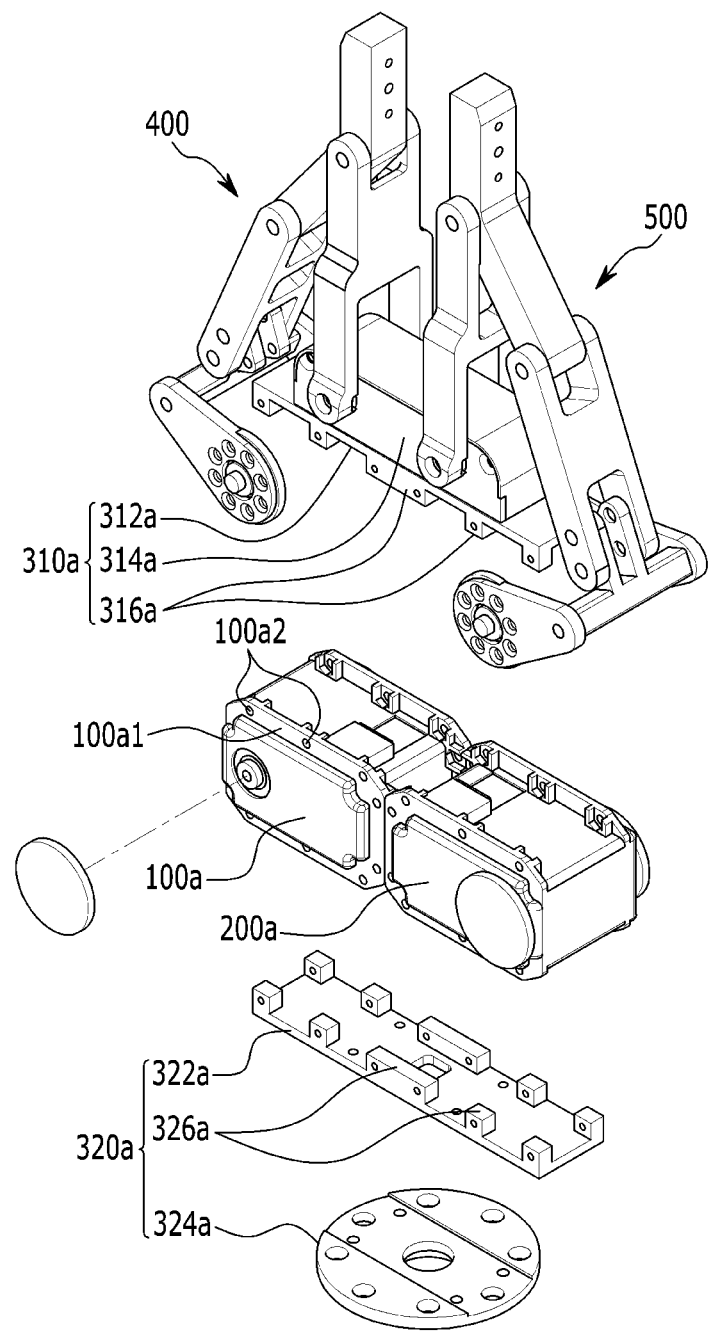
FIG. 5 is a partially exploded perspective view showing a coupling relation of an electric gripping device according to another embodiment of the present invention.

FIG. 4 is a perspective view showing a coupling state of an electric gripping device according to another embodiment of the present invention, and FIG. 5 is a partially exploded perspective view showing a coupling relation of an electric gripping device according to another embodiment of the present invention. Referring to FIG. 4 and FIG. 5, the electric gripping device according to another embodiment of the present invention is different in the method that a first actuator module 100a and a second actuator module 200a are coupled to the main body unit 300a, and may be equally applied to the electric gripping device according to an embodiment of the present invention in configuration and operation other than the coupling method.

Referring to FIG. 4 and FIG. 5, the main body unit 300a may include a first body unit 310a provided on one side via the first actuator module 100a and the second actuator module 200a and coupled with the first actuator module 100a and the second actuator module 200a, and a second body unit 320a provided on the other side corresponding to the first body unit 310a via the first actuator module 100a and the second actuator module 200a and coupled with the first actuator module 100a and the second actuator module 200a.

The first body unit 310a may include an eleventh body member 312a formed of a cuboid panel shape and a twelfth body member 314a formed on the eleventh body member 312a and having a second coupling unit. An eleventh coupling unit 316a may be formed at the positions respectively corresponding to the first fixing unit and the second fixing unit at the lower surface of the eleventh body member 312a. Here, the first fixing unit and the second fixing unit may be formed on the first actuator module 100a and the second actuator module 200a with the same shape as each other. The first fixing unit may include a plurality of fastening holes 100a2 provided in a protrusion portion 100a1 formed along both circumferential surfaces of the first actuator module 100a.

The second body unit 320a may include a twenty-first body member 322a formed with a cuboid panel shape at a position corresponding to the eleventh body member 312a via the first actuator module 100a and the second actuator module 200a, and a twenty-second body member 324a formed under the twenty-first body member 322a and having a hand coupling unit. A twenty-first coupling unit 326a may be formed at a position respectively corresponding to the first fixing unit and the second fixing unit on the upper surface of the twenty-first body member 322a.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. An electric gripping device comprising:
   a first actuator module having a first fixing unit and generating a torque of a first drive shaft;
   a second actuator module having a second fixing unit and generating a torque of a second drive shaft;
   a main body unit having a first coupling unit in which the first actuator module is coupled at a position corresponding to the first fixing unit and the second actuator module is coupled at a position corresponding to the second fixing unit and a second coupling unit outside of which a part of a gripper is coupled;
   a first finger link unit having one end that is connected to each of the first actuator module and the main body to be link-connected and transmitting power corresponding to a first clamper of another end of the first finger link unit; and
   a second finger link unit having one end that is connected to each of the second actuator module and the main body unit to be link-connected and transmitting power corresponding to a second clamper of another end of the second finger link unit,
   wherein the first finger link unit and the second finger link unit are formed of a four-joint link, respectively, the first clamper and the second clamper are separated from each other to be provided at a position facing each other along a length direction of the main body unit, and the first clamper and the second clamper approach or are separated from each other,
   wherein
   the first finger link unit includes:
   an eleventh link rotating with a first connection point coupled to both sides of a length direction of the first drive shaft;
   a twelfth link rotating with a second connection point coupled to the main body unit;
   a thirteenth link rotating with a third connection point coupled to the eleventh link; and
   a fourteenth link having a fourth connection point coupled with the thirteenth link at one end, a fifth connection point coupled with the twelfth link at a bent part, and a fourteenth link with a first clamper at another end of the fourteenth link.

2. The electric gripping device of claim 1, wherein a straight line length (a1) between the first connection point and the second connection point is the same as a straight line length (a2) between the fourth connection point and the fifth connection point.

3. The electric gripping device of claim 2, wherein a straight line length (b1) between the first connection point and the fourth connection point is the same as a straight line length (b2) between the second connection point and the fifth connection point.

4. The electric gripping device of claim 1, wherein the eleventh link includes:
   an eleventh connection part having one end respectively coupled to both sides of a length direction of the first drive shaft another end disposed to be inclined with a predetermined angle upward; and
   a twelfth connection part including an eleventh coupling rod formed in a length direction and coupled between other ends of the eleventh connection part and a twelfth coupling rod formed to be elongated with a predetermined angle at a center of the length direction of the eleventh coupling rod to be coupled with one end of the twelfth link,
   wherein the eleventh connection part and the twelfth connection part are coupled to be inclined with a predetermined angle in consideration of driving interference with the first actuator module.

5. An electric gripping device comprising:
   a first actuator module having a first fixing unit and generating a torque of a first drive shaft;
   a second actuator module having a second fixing unit and generating a torque of a second drive shaft;
   a main body unit having a first coupling unit in which the first actuator module is coupled at a position corresponding to the first fixing unit and the second actuator module is coupled at a position corresponding to the second fixing unit and a second coupling unit outside of which a part of a gripper is coupled;
   a first finger link unit having one end that is connected to each of the first actuator module and the main body to be link-connected and transmitting power corresponding to a first clamper of another end of the first finger link unit; and
   a second finger link unit having one end that is connected to each of the second actuator module and the main body unit to be link-connected and transmitting power corresponding to a second clamper of another end of the second finger link unit,
   wherein the first finger link unit and the second finger link unit are formed of a four-joint link, respectively, the first clamper and the second clamper are separated from each other to be provided at a position facing each other along a length direction of the main body unit, and the first clamper and the second clamper approach or are separated from each other,
wherein
the second finger link unit includes:
a twenty-first link rotating with a first connection point coupled to both sides of a length direction of the second drive shaft;
a twenty-second link rotating with a second connection point coupled to the main body unit;
a twenty-third link rotating with a third connection point coupled to the twenty-first link; and
a twenty-fourth link having a fourth connection point coupled with the twenty-third link at one end, a fifth connection point coupled with the twenty-second link at a bent part, and a second clamper at another end of the twenty-fourth link.

6. The electric gripping device of claim 5, wherein the twenty-first link includes:
a twenty-first connection part having one end respectively coupled to both sides of a length direction of the second drive shaft and another end disposed to be inclined upward with a predetermined angle; and
a twenty-second connection part having a twenty-first coupling rod formed in a length direction and coupled between other ends of the twenty-first connection part and a twenty-second coupling rod elongated with a predetermined angle at a center part of a length direction of the twenty-first coupling rod and coupled with one end of the twenty-second link,
wherein the twenty-first connection part and the twenty-second connection part are combined obliquely at a predetermined angle in consideration of driving interference with the second actuator module.

7. An electric gripping device comprising:
a first actuator module having a first fixing unit and generating a torque of a first drive shaft;
a second actuator module having a second fixing unit and generating a torque of a second drive shaft;
a main body unit having a first coupling unit in which the first actuator module is coupled at a position corresponding to the first fixing unit and the second actuator module is coupled at a position corresponding to the second fixing unit and a second coupling unit outside of which a part of a gripper is coupled;
a first finger link unit having one end that is connected to each of the first actuator module and the main body to be link-connected and transmitting power corresponding to a first clamper of another end of the first finger link unit; and
a second finger link unit having one end that is connected to each of the second actuator module and the main body unit to be link-connected and transmitting power corresponding to a second clamper of another end of the second finger link unit,
wherein the first finger link unit and the second finger link unit are formed of a four-joint link, respectively, the first clamper and the second clamper are separated from each other to be provided at a position facing each other along a length direction of the main body unit, and the first clamper and the second clamper approach or are separated from each other,
wherein
the main body unit includes:
a first body unit provided at one side via the first actuator module and the second actuator module and coupled with the first actuator module and the second actuator module; and
a second body unit provided at another side corresponding to the first body unit via the first actuator module and the second actuator module and coupled with the first actuator module and the second actuator module.

8. The electric gripping device of claim 7, wherein the first body unit includes:
an eleventh body member formed of a cuboid panel shape; and
a twelfth body member formed on the eleventh body member and having the second coupling unit,
wherein an eleventh coupling unit is formed at a position respectively corresponding to the first fixing unit and the second fixing unit at a lower surface of the eleventh body member.

9. The electric gripping device of claim 8, wherein the second body unit includes:
a twenty-first body member formed at a position corresponding to the eleventh body member via the first actuator module and the second actuator module; and
a twenty-second body member formed under the twenty-first body member and having a hand coupling unit, and
a twenty-first coupling unit is formed at a position respectively corresponding to the first fixing unit and the second fixing unit at an upper surface of the twenty-first body member.

10. An electric gripping device comprising:
a first actuator module having a first fixing unit and generating a torque of a first drive shaft;
a second actuator module having a second fixing unit and generating a torque of a second drive shaft;
a main body unit having a first coupling unit in which the first actuator module is coupled at a position corresponding to the first fixing unit and the second actuator module is coupled at a position corresponding to the second fixing unit and a second coupling unit outside of which a part of a gripper is coupled;
a first finger link unit having one end that is connected to each of the first actuator module and the main body to be link-connected and transmitting power corresponding to a first clamper of another end of the first finger link unit; and
a second finger link unit having one end that is connected to each of the second actuator module and the main body unit to be link-connected and transmitting power corresponding to a second clamper of another end of the second finger link unit,
wherein the first finger link unit and the second finger link unit are formed of a four-joint link, respectively, the first clamper and the second clamper are separated from each other to be provided at a position facing each other along a length direction of the main body unit, and the first clamper and the second clamper approach or are separated from each other,
wherein
the first fixing unit and the second fixing unit are formed at the first actuator module and the second actuator module, respectively, and the first fixing unit includes a fastening hole provided at a concave groove formed at an edge of the first actuator module.

11. An electric gripping device comprising:
a first actuator module having a first fixing unit and generating a torque of a first drive shaft;

a second actuator module having a second fixing unit and generating a torque of a second drive shaft;

a main body unit having a first coupling unit in which the first actuator module is coupled at a position corresponding to the first fixing unit and the second actuator module is coupled at a position corresponding to the second fixing unit and a second coupling unit outside of which a part of a gripper is coupled;

a first finger link unit having one end that is connected to each of the first actuator module and the main body to be link-connected and transmitting power corresponding to a first clamper of another end of the first finger link unit; and a second finger link unit having one end that is connected to each of the second actuator module and the main body unit to be link-connected and transmitting power corresponding to a second clamper of another end of the second finger link unit, wherein the first finger link unit and the second finger link unit are formed of a four-joint link, respectively, the first clamper and the second clamper are separated from each other to be provided at a position facing each other along a length direction of the main body unit, and the first clamper and the second clamper approach or are separated from each other, wherein the first fixing unit and the second fixing unit are formed at the first actuator module and the second actuator module, and the first fixing unit includes a plurality of fastening holes provided at a protrusion formed along a circumferential surface on both sides of the first actuator module.

* * * * *